Figure 1:
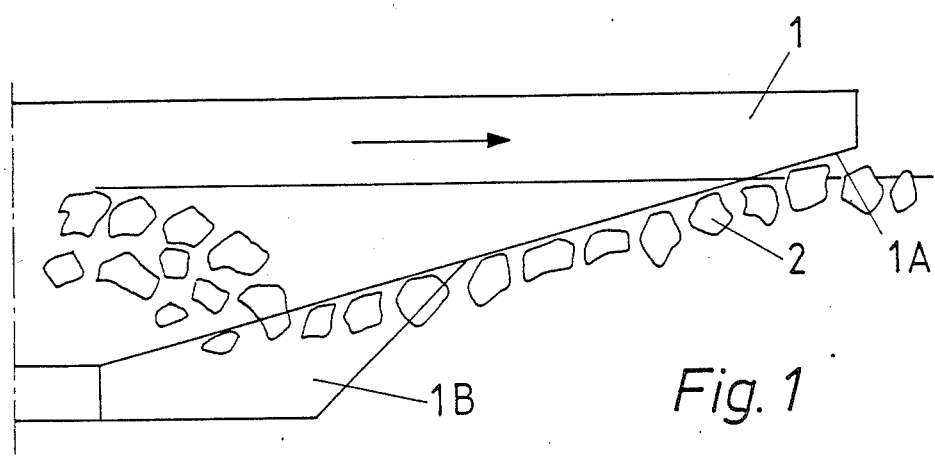

United States Patent [19]

Lundin

[11] Patent Number: 4,747,361
[45] Date of Patent: May 31, 1988

[54] ARRANGEMENT ON A WATER CRAFT FOR COLLECTING OIL PRESENT ON THE WATER SURFACE, IN PARTICULAR, AMONG ICE BLOCKS.

[75] Inventor: Lars Lundin, Porvoo, Finland

[73] Assignee: Oy Lars Lundin Patent AB, Porvoo, Finland

[21] Appl. No.: 49,016

[22] Filed: Apr. 30, 1987

Related U.S. Application Data

[63] Continuation of Ser. No. 799,378, filed as PCT FI85/00021 Mar. 5, 1985, published as WO85/03917, Sep. 12, 1985, abandoned.

[30] Foreign Application Priority Data

Mar. 5, 1984 [FI] Finland ................................. 840875

[51] Int. Cl.⁴ ............................................. B63B 35/32
[52] U.S. Cl. ................................. 114/270; 210/242.3; 210/923
[58] Field of Search ......................... 114/40–42, 114/61–63, 270, 288; 210/242.1, 242.3, 922, 923, 776, 779, 241; 198/643; 15/5, 77, 88

[56] References Cited

U.S. PATENT DOCUMENTS

| | | | |
|---|---|---|---|
| 3,314,540 | 4/1967 | Vane | 210/776 |
| 3,664,505 | 5/1972 | Brittingham | 210/242.3 |
| 3,715,034 | 2/1973 | Ivanoff | 210/242.3 |
| 3,804,251 | 4/1974 | Farrell | 210/242.3 |
| 3,878,804 | 4/1975 | Legerer | 114/40 |
| 3,913,511 | 10/1975 | Weiland | 114/42 |
| 3,977,345 | 8/1976 | Worthing | 114/40 |
| 4,039,454 | 8/1977 | Miller | 210/242.3 |
| 4,083,317 | 4/1978 | Chaney | 114/40 |
| 4,208,754 | 6/1980 | Hille | 15/88 |
| 4,348,972 | 9/1982 | Parsons | 114/61 |
| 4,409,918 | 10/1983 | Wagner | 114/40 |
| 4,486,911 | 12/1984 | Beke | 15/77 |

FOREIGN PATENT DOCUMENTS

| | | | |
|---|---|---|---|
| 2226635 | 5/1972 | Fed. Rep. of Germany | 114/40 |
| 363786 | 8/1971 | Sweden | 114/40 |
| 7404001-5 | 3/1974 | Sweden | 114/40 |
| 1243534 | 11/1968 | United Kingdom | 114/40 |

OTHER PUBLICATIONS

English Language Abstract of USSR, 83-799464/43.
English Language Abstract of USSR, 83-793383/42.

Primary Examiner—Sherman D. Basinger
Assistant Examiner—Clifford T. Bartz
Attorney, Agent, or Firm—Biebel, French & Nauman

[57] ABSTRACT

An arrangement on a water craft for collecting oil that is present on the surface of the water, particularly among ice blocks. The underside (1A) of the craft's bow (1) has been made substantially planar and very gently inclined, for instance about 10°–20°, so that when the craft is travelling forward the ice blocks (2) might be forced along the underside (1A) under the water and be simultaneously flushed in the water. Moreover, in said underside (1A) have been made water inlet openings, which are elongated, parallel slits (3) and which prevent the entry of ice blocks. Inside the craft, the oil (5) is separated from the water (4) by means of a separating member (6), whereafter the water (7) is pumped out again. To intensify the flushing of the ice blocks (2), the pumped-out water is jetted against the ice blocks in the region of the inlet openings (3). The bottom of the bow (1) may be slightly deeper on the sides than its planar centerpart.

3 Claims, 2 Drawing Sheets

ARRANGEMENT ON A WATER CRAFT FOR COLLECTING OIL PRESENT ON THE WATER SURFACE, IN PARTICULAR, AMONG ICE BLOCKS.

This is a continuation of Ser. No. 799,378 filed as PCTF185/00021 on Mar. 5, 1985, published as WO85/03917 on Sep. 12, 1985, now abandoned.

The present invention concerns an arrangement on a water craft for collecting oil that is present on the water surface, and in particular oil that is present among ice blocks, the hull of the water craft having at least one opening for admitting oil-admixed water into the craft, separating members for separating the oil and the water, and pumping members for pumping the separated water from the craft.

For collecting oil from the free water surface, numerous designs are known in the art. One such design is the above-mentioned intake of oil-admixed water through an opening in the water craft, separating the water from the oil, and its pumping out of the craft. However, all designs of prior art are in practice rather poorly suited for collecting oil from water in which there are ice blocks. A need for such is for instance encountered when channels opened through the ice become polluted owing to oil releases. On one hand the difficulty is that the oil adheres to the ice blocks as they are pushed aside by the collecting craft, and on the other hand, that the ice blocks present in the water obstruct oil separation, or even make it impossible.

The object of the present invention is to eliminate these problems, and for attaining this aim, the invention is mainly characterized in that the bow of the water craft is substantially planar and remarkably gently inclined on its underside so that as the craft is driven forward the ice blocks on the water surface sink under the water surface along the bow underside, and that the gently inclined bow underside is provided with water intake openings, for instance in the shape of elongated parallel slits.

Thanks to this kind of design, the ice blocks are forced under the water, and at the same time the water jets aid the cleaning of the blocks from oil. The intake openings are made such that the ice blocks cannot pass through them. In one preferred embodiment the separation pumps inside the craft provide water jets inwards from the sides of the water craft, towards the ice blocks and the water inlet openings.

Figure 2:
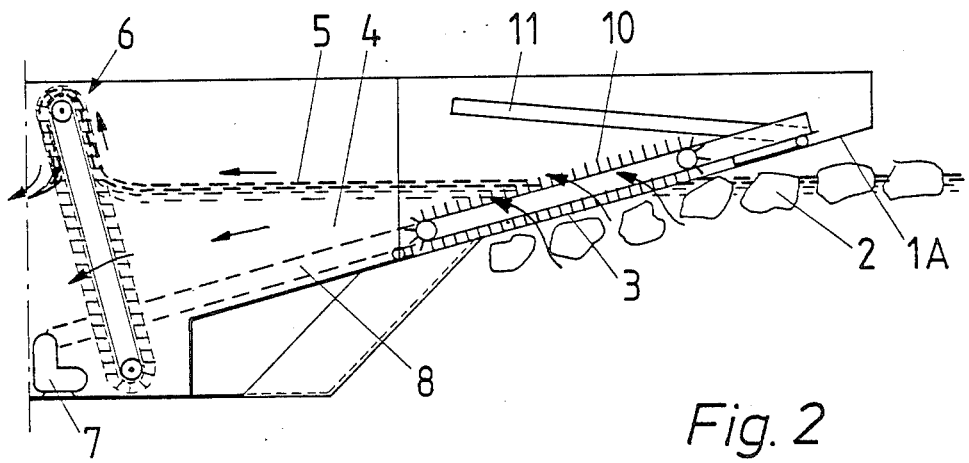
Figure 3:
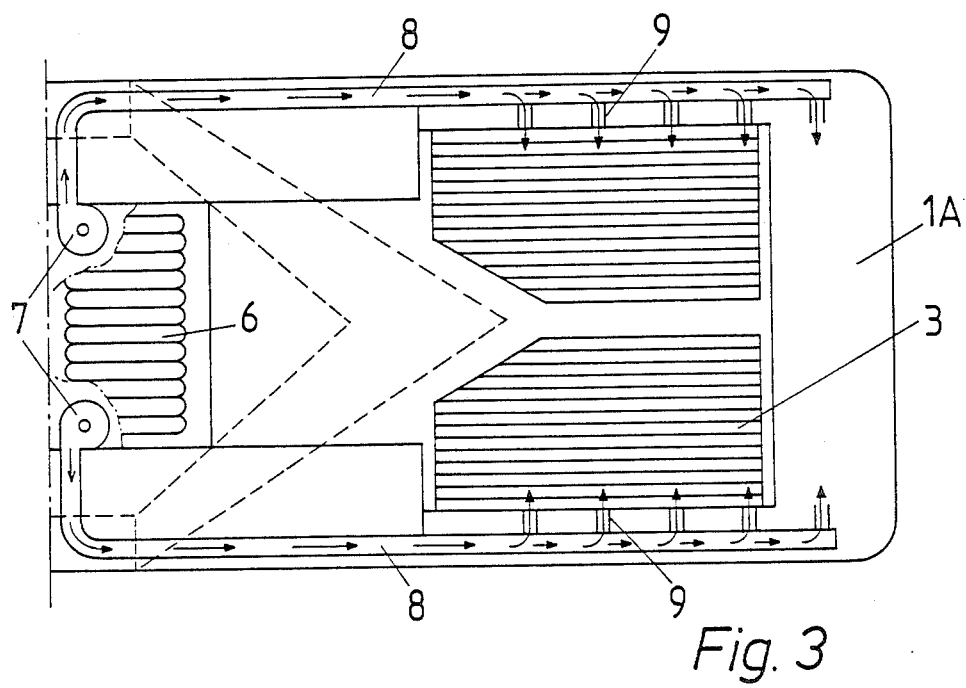
Figure 4:
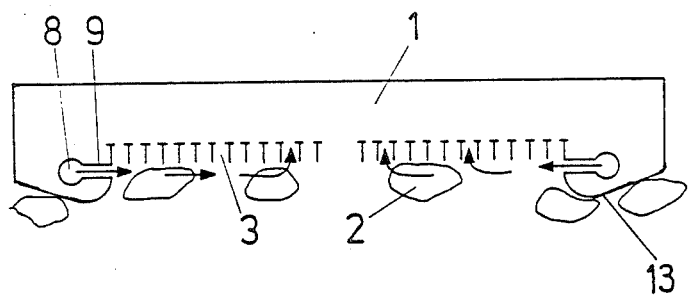
Figure 5:
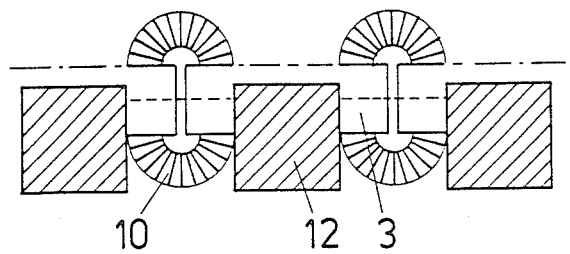

The other features and advantages of the invention are described more in detail in the following in the form of an example and referring to the drawings attached, wherein:

FIG. 1 presents schematically the bow of the craft of the invention in elevational view, FIG. 2 presents schematically the cross-section of the bow with the equipment inside the craft, FIG. 3 presents the bottom part of the bow, FIG. 4 presents a cross-section of the bow, and FIG. 5 shows on enlarged scale part of the water inlet openings.

In the drawings, the bow of the craft in general has been indicated with reference numeral 1, and in FIG. 1, the travelling direction of the craft is shown by an arrow. The bow underside is indicated by reference numeral 1A, and the part of the underside more to the craft, by reference numeral 1B. Ice blocks in the water are denoted with reference numeral 2.

In the bow underside 1A have been made water inlet openings 3 which have the shape of parallel elongated slits. Water may through these gaps enter the space 4 inside the craft, and likewise the oil 5 along with the water. The oil is separated from the water by means of a separating member which, as shown in FIG. 2, is a continuous member extending obliquely into the water space, for instance of the kind described in the U.S. Ser. No. 617,379 filed June 5, 1984, now abandoned. The oil is separated from the member 6 to be conducted to a tank. The water is discharged from the craft by pumps 7. For intensifying the cleaning of ice blocks, it is possible hereby to make such arrangements that the water discharged by the pumps is jetted from the sides of the bow towards the ice blocks 2 and the inlet openings 3. This arrangement is better understood by reference to FIG. 3. Here, water conduits 8 have been provided on both sides of the bow, and at the inlet openings 3 there are inward aiming water nozzles 9.

As is seen in FIGS. 2 and 5, another member 10 for instance brushes which are mounted to move in the direction of the slits to prevent occlusion of the slits, has been provided adjacent to the inlet openings 3 to keep the openings 3 between the longitudinal beams 12 clean. The member 10 can be of the same type of separating device as described in the above-identified co-pending U.S. Ser. No. 617,379, now abandoned in which the individual loops with brushes extending along the slots 3, as shown in FIG. 5, keep the slots open and simultaneously prevent smaller pieces of ice from entering the bow, and it may also be arranged to be liftable if desired.

Furthermore, a hinged hatch 11 by which the openings 3 may be closed has been arranged inside the bow.

The cross-section of the bow 1 is schematically presented in FIG. 4. On the sides of the bow, there are side parts projecting somewhat deeper and preventing the ice blocks from being diverted to the sides. On these deeper side parts have been provided the water conduits 8 and the nozzles 9 directed inward on the sides, described in the foregoing. The lower surface 13 of the side portion is gently outwardly inclined, e.g. 10°–30°, in order to make easier turning of the water craft among the ice.

As taught by the invention, the bow underside must be very gently inclined so that the ice blocks are forced under the water surface, being flushed at the same time, in order to separate the oil from the surface of the blocks. The inclination of the bow underside is most appropriately in the range 10°–20°, and in any case about 30° at the highest. It is obvious that the shape of the bow underside need not be completely planar, and that it may also otherwise differ from the shape presented in the example of the drawing, without implying any departure from the idea of the invention. It is also obvious that the water and oil separating member may be any such member serving the purpose.

I claim:

1. In a water craft arrangement for collecting oil present on the water surface, particularly among ice blocks, wherein the water craft includes a bow having a gently inclined bottom surface so that when the craft is traveling forward, ice blocks on the water surface are forced under the water along said bottom surface, intake openings in said bottom surface for the intake of oil-admixed water, means provided in the water craft for separating oil and water and pumping means for discharging the separated water, and margin portions extending along the sides of said inclined bottom surface to a greater depth than the bottom surface, the improvement comprising:

water nozzles provided on said margin portions and directed inwardly toward said bottom surface and intake openings in order to effect removal of oil from ice blocks passing along said bottom surface, said intake openings being in the form of mutually parallel slits extending in the longitudinal direction of the water craft bow, and slit cleaning members in the form of brush means provided at each said slit movable therealong to prevent occlusion of the slit.

2. Arrangement accordingly to claim 1, characterized in that the water intake openings consist of said slits between parallel beams extending longitudinally in the bow underside, and which prevent the entry of at least bigger ice blocks.

3. Arrangement according to claim 1 characterized in that the intake openings are provided with a closable hatch.

* * * * *